United States Patent
Miyamoto

(10) Patent No.: US 7,494,401 B2
(45) Date of Patent: *Feb. 24, 2009

(54) POLISHING METHOD, POLISHING DEVICE, GLASS SUBSTRATE FOR MAGNETIC RECORDING MEDIUM, AND MAGNETIC RECORDING MEDIUM

(75) Inventor: Takemi Miyamoto, Yamanashi-ken (JP)

(73) Assignee: Hoya Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/330,904

(22) Filed: Jan. 12, 2006

(65) Prior Publication Data

US 2006/0128278 A1 Jun. 15, 2006

Related U.S. Application Data

(60) Division of application No. 09/602,143, filed on Jun. 23, 2000, now Pat. No. 7,070,481, which is a continuation-in-part of application No. 09/162,056, filed on Sep. 28, 1998, now Pat. No. 6,280,294.

(30) Foreign Application Priority Data

Sep. 30, 1997 (JP) .............................. 1997-282613

(51) Int. Cl.
*B24B 1/00* (2006.01)
(52) U.S. Cl. ........................................ 451/44; 451/104
(58) Field of Classification Search ................ 451/44, 451/104, 106, 108, 109, 110, 111, 113, 41, 451/42, 43

See application file for complete search history.

(56) References Cited

U.S. PATENT DOCUMENTS

| | | | |
|---|---|---|---|
| 1,961,487 A * | 6/1934 | Hamann | 451/44 |
| 4,718,202 A * | 1/1988 | Worsham | 451/44 |
| 5,274,959 A * | 1/1994 | Dyer et al. | 451/242 |
| 5,465,475 A | 11/1995 | Kinoshita et al. | |
| 5,486,134 A | 1/1996 | Jones et al. | 451/209 |
| 5,514,025 A * | 5/1996 | Hasegawa et al. | 451/44 |
| 5,861,066 A | 1/1999 | Moinpour et al. | 134/6 |
| 5,916,656 A | 6/1999 | Kitayama et al. | |
| 6,036,785 A | 3/2000 | Ferrell | 134/1 |
| 6,055,694 A | 5/2000 | Steere | 15/77 |
| 6,059,903 A | 5/2000 | Roloff et al. | 148/644 |
| 6,086,977 A | 7/2000 | Suzuki et al. | |
| 6,280,294 B1 | 8/2001 | Miyamoto | |
| 6,361,708 B1 * | 3/2002 | Kubo et al. | 216/88 |

(Continued)

FOREIGN PATENT DOCUMENTS

JP 08-192586 7/1996

(Continued)

*Primary Examiner*—Jacob K Ackun, Jr.
(74) *Attorney, Agent, or Firm*—Cook Alex Ltd.

(57) ABSTRACT

There are disclosed a polishing method and a polishing device in which cleaning of a glass substrate surface can be achieved to a high level. A glass substrate (MD substrate 1) in the shape of a circular disc having a circular hole in a center portion is polished with an abrasive liquid 50 containing free abrasive grains being supplied, and an inner peripheral end surface of the glass substrate is polished using the abrasive liquid containing the free abrasive grains by rotating a rotary brush 4 or a polishing pad in contact with the inner peripheral end surface.

6 Claims, 5 Drawing Sheets

U.S. PATENT DOCUMENTS 6,641,465 B2    11/2003    Miyamoto    ................    451/104

FOREIGN PATENT DOCUMENTS

| JP | 08-257912 | 10/1996 |
| --- | --- | --- |
| JP | 09-102120 | 4/1997 |
| JP | 09-124343 | 5/1997 |
| JP | 09-180183 | 7/1997 |
| JP | 09-192999 | 7/1997 |
| JP | 09-314458 | 12/1997 |
| JP | 10-237426 | 9/1998 |
| JP | 11-028649 | 2/1999 |

* cited by examiner

POLISHING METHOD, POLISHING DEVICE, GLASS SUBSTRATE FOR MAGNETIC RECORDING MEDIUM, AND MAGNETIC RECORDING MEDIUM

REFERENCE TO RELATED APPLICATION

This application is a divisional of U.S. application Ser. No. 09/602,143 filed on Jun. 23, 2000 (now U.S. Pat. No. 7,070,481 issued Jul. 4, 2006) which is a continuation-in-part (CIP) of U.S. application Ser. No. 09/162,056 filed on Sep. 28, 1998 (now U.S. Pat. No. 6,280,294 issued Aug. 28, 2001).

BACKGROUND OF THE INVENTION (i) Field of the Invention

The present invention relates to a polishing method and a polishing device, particularly to a polishing method and a polishing device which can preferably be used for polishing an inner peripheral end surface or another surface of a glass substrate for a magnetic recording medium, and the like.

(ii) Description of the Related Art

An aluminum substrate has been broadly used as a substrate for a magnetic disc or another magnetic recording medium, but accompanying miniaturization/thinning of the magnetic disc and densification of recording, the aluminum substrate is increasingly replaced with a glass substrate which is superior to the aluminum substrate in surface flatness and substrate strength.

In general, a glass substrate chemically reinforced to raise the substrate strength, or a crystallized glass substrate whose strength is raised by crystallization is used as the glass substrate for the magnetic recording medium.

Moreover, for a magnetic head, high-density recording brings about a transition from a thin-film head to a magnetic resisting head (a magnetro-resistive head) (MR head) and a giant magnetic resisting head (a giant magnetro-resistive head) (GMR head). Therefore, it is expected that regeneration of the magnetic recording medium using the glass substrate with the magnetic resisting head becomes a mainstream from now on.

In this manner, various improvements are added to the magnetic disc for high-density recording, and with the progress of the magnetic disc, new problems in the glass substrate for the magnetic recording medium arise one after the other. One of them is high-level cleaning of a glass substrate surface. Specifically, foreign particles sticking to the glass substrate surface may cause defects of a thin film formed on the glass substrate surface, or form convex portions on a thin film surface. An adequate glide height cannot be obtained.

Moreover, in the regeneration of the magnetic recording medium using the glass substrate with the magnetic resisting head, if the flying height of the head is lowered to enhance recording density, regeneration error may occur, or regeneration cannot be performed. Such disadvantageous phenomenon is caused by thermal asperity resulting from the convex portions formed on the magnetic disc surface by the particles on the glass substrate. In this case, heat is generated on the magnetic resisting head (the magnetro-resistive head), the resistance of the head is fluctuated, and electromagnetic conversion is adversely affected.

The cause of the foreign particles on the surface of the glass substrate for the magnetic recording medium lies in that a glass substrate end surface having no smooth state grinds against a wall face of a resin case. Resin or glass particles generated by the grinding, and other particles caught by inner and outer peripheral end surfaces of the glass substrate stick to the surface. Inventors et al. have found that especially the inner peripheral end surface of the glass substrate is coarser than the outer peripheral end surface, more easily catches particles, and obstructs the high-level cleaning of the glass substrate surface.

Additionally, proposed is a technique of removing cracks generated on an end surface portion of a glass substrate by chemical etching to enhance a substrate strength (Japanese Patent Application Laid-open No. 230621/1995). In this case, the depth of the crack is decreased, but the crack is etched, enlarged and indented to easily catch particles, which further obstructs the high-level cleaning of the glass substrate surface. Moreover, in the chemical etching, it is difficult to control the surface precision of the end surface portion at a high level. Furthermore, it is difficult to completely remove cracks, and only an insufficient deflection strength is provided.

SUMMARY OF THE INVENTION

The present invention has been accomplished under the circumstances above, and a first object thereof is to provide a polishing method, a polishing device, and the like in which an end surface of a glass substrate or the like can efficiently be smoothed at low cost and high level, especially, an inner peripheral end surface of the glass substrate or the like difficult to be polished can efficiently be smoothed at low cost and high level, so that cleaning of a substrate surface can be achieved to a high level.

A second object is to provide a glass substrate for a magnetic recording medium in which cleaning of a glass substrate surface is achieved to a high level.

A third object is to provide a magnetic recording medium in which troubles caused by foreign particles on a substrate surface are minimized.

According to the first aspect of the invention, there is provided a polishing method in which an inner peripheral end surface and/or an outer peripheral end surface of a circular disc having a circular hole in a center portion is polished using an abrasive liquid containing free abrasive grains.

According to the second aspect of the invention, there is provided a polishing method in which a glass substrate in the shape of a circular disc having a circular hole in a center portion is immersed in an abrasive liquid containing free abrasive grains, and an inner peripheral end surface and/or an outer peripheral end surface of the glass substrate is polished using the abrasive liquid containing the free abrasive grains.

According to the third aspect of the invention, there is provided a polishing method in which a glass substrate in the shape of a circular disc having a circular hole in a center portion is immersed in an abrasive liquid containing the free abrasive grains, and an inner peripheral end surface and/or an outer peripheral end surface of the glass substrate is polished using the abrasive liquid containing free abrasive grains by rotating a polishing brush or a polishing pad in contact with the glass substrate.

In the polishing method, the viscosity of the abrasive liquid containing the free abrasive grains is preferably 1.5 to 25 cps.

Furthermore, there is disclosed a method of manufacturing a glass substrate for a magnetic recording medium which comprises a step of polishing an inner peripheral end surface and/or an outer peripheral end surface of the glass substrate in the polishing method described above.

According to the fourth aspect of the invention, there is provided a glass substrate for a magnetic recording medium in which surface roughness Ra of a chamfered portion and/or a side-wall portion of an inner peripheral end surface and/or an outer peripheral end surface is 0.001 to 0.04 μm.

The magnetic recording medium can be prepared by forming at least a magnetic layer on the aforementioned glass substrate.

The magnetic recording medium can be used as a magnetic recording medium for a magnetic resisting head (a magnetro-resistive head) (MR head) or a giant magnetic resisting head (a giant magnetro-resistive head) (GMR head).

As the magnetic layer, a magnetic layer including Co and Pt can be used.

According to the fifth aspect of the invention, there is provided a polishing device which comprises an abrasive liquid container in which an abrasive liquid is contained, a rotary support disposed on a bottom of the abrasive liquid container, a substrate case detachably mounted on the rotary support for holding a large number of circular discs each having a circular hole in a center portion, and a rotary brush inserted in the circular holes of the circular discs.

According to the sixth aspect of the invention, there is provided a polishing method in which an abrasive liquid containing free abrasive grains is supplied to an inner peripheral end surface and/or an outer peripheral end surface of a glass substrate in the shape of a circular disc having a circular hole in a center portion, and the glass substrate is polished by rotating a polishing brush or a polishing pad in contact with the inner peripheral end surface and/or the outer peripheral end surface.

In the above polishing method, a plurality of glass substrates are preferably stacked and polished so that the inner peripheral end surfaces and/or the outer peripheral end surfaces of the plurality of glass substrates are simultaneously polished.

The polishing can be performed by supplying the abrasive liquid containing the free abrasive grains at a flow rate of 500 ml/min to 3000 ml/min.

Bristles of the polishing brush are inclined and disposed with respect to a plane vertical to a rotation shaft, and the polishing brush can be rotated in a direction in which the abrasive liquid is drawn into the circular hole portion of the plurality of stacked glass substrates.

Moreover, the inclination angle of the bristles of the polishing brush is preferably in a range of 2° to 30°.

The viscosity of the abrasive liquid containing the free abrasive grains is preferably in a range of 1.5 to 25 cps.

According to the seventh aspect of the invention, there is provided a polishing device which comprises holding means for stacking and holding a plurality of glass substrates in the form of circular discs having circular holes in center portions, rotation means for rotating the holding means, a rotary brush inserted to the circular hole portion of the plurality of stacked glass substrates, and abrasive liquid supply means for supplying an abrasive liquid to the circular hole portion of the plurality of stacked glass substrates.

According to the eighth aspect of the invention, there is provided a polishing device which comprises holding means for stacking and holding a plurality of glass substrates in the form of circular discs having circular holes in center portions, rotation means for rotating the holding means, a rotary brush in contact with the outer periphery of the plurality of stacked glass substrates, and abrasive liquid supply means for supplying an abrasive liquid to the outer peripheral end surface of the plurality of stacked glass substrates.

Furthermore, there is disclosed a method of manufacturing a glass substrate for a magnetic recording medium which comprises a step of polishing an inner peripheral end surface and/or an outer peripheral end surface of the glass substrate in the polishing method in accordance with the sixth through eighth aspects of the present invention.

The magnetic recording medium can be prepared by forming at least a magnetic layer on the aforementioned glass substrate.

Additionally, each of the inner and outer peripheral end surfaces in the present invention includes a chamfered portion and a side-wall portion.

According to the first aspect, by polishing the inner and outer peripheral end surfaces of the glass substrate or the like using the abrasive liquid containing the free abrasive grains, the surfaces can be smoothed more efficiently at lower cost and higher level, as compared with a polishing method in which a diamond abrasive wheel (fixed abrasive grain) or a chemical etching is used. Especially, the inner peripheral end surface of the glass substrate or the like difficult to be polished with high precision can efficiently be smoothed at low cost and high level. When the diamond abrasive wheel is used, only raised portions (apexes of protrusions) of the polished surface are scraped off, and poor smoothness is provided. In the chemical etching, cracks are etched, enlarged and indented to easily catch particles, which obstructs the high-level cleaning of the glass substrate surface. Moreover, the glass substrate end surface provides poor smoothness, and foreign particles are generated by frictional grinding or the like. Furthermore, since it is difficult to completely remove the cracks, inferior deflection strength is provided.

According to the second aspect, by immersing and polishing in the abrasive liquid containing the free abrasive grains, a sufficient amount of the abrasive liquid is allowed to exist on the inner peripheral end surface and/or the outer peripheral end surface. Therefore, polishing insufficiency or defect because of liquid shortage can be avoided.

According to the third aspect, by combining the immersion into the abrasive liquid containing the free abrasive grains with the brush polishing or the like, especially the inner peripheral end surface of the glass substrate or another surface difficult to be polished with high precision can efficiently be smoothed at low cost and high level. Moreover, not only the chamfered portions but also the side-wall portions of the inner and outer peripheral end surfaces of the glass substrate can also be smoothed efficiently at low cost and high level. If both the chamfered portion and the side-wall portion are smooth, the effect of the present invention is further enlarged.

Moreover, in a case where the inner peripheral end surface defining a small-diameter hole is polished with the rotary brush, in a mode of continuously supplying the abrasive liquid to the rotary brush, the abrasive liquid is scattered by the rotary brush rotating at a high speed, and the periphery of the rotary brush is brought in a vacuum state to reject the abrasive liquid. In this manner, the abrasive liquid is insufficiently applied to the polished surface. However, by the immersion into the abrasive liquid containing the free abrasive grains, polishing insufficiency or defect is prevented from occurring because of liquid shortage. Moreover, even when a rotary brush having elastic bristles is used, the elasticity of the bristles immersed in the abrasive liquid is moderated by the viscosity resistance or another property of the abrasive liquid. Since the bristles are prevented from colliding against the polished surface unnecessarily strong, a possibility of scratching or damaging the polished surface can remarkably be reduced. Furthermore, for example, by arranging the bristles helically on a rotation shaft, the fluidity of the abrasive liquid is prompted. Since a fresh abrasive liquid can constantly be circulated/supplied to the polished surface, polishing efficiency, reproducibility and precision can be enhanced.

By setting the viscosity of the abrasive liquid containing the free abrasive grains in a range of 1.5 to 25 cps (20° C.), polishing efficiency, reproducibility and polishing precision can be enhanced, while the possibility of scratching or damaging the polished surface can remarkably be reduced. In this respect, the viscosity of the abrasive liquid containing the free abrasive grains is more preferably in a range of 1.8 to 5 cps (20° C.). By employing the above-mentioned polishing method, the cleaning of the glass substrate surface can be achieved to a high level, and the glass substrate for the magnetic recording medium superior in deflection strength can be manufactured.

According to the fourth aspect, by defining the surface roughness of the chamfered portion and/or the side-wall portion of the inner peripheral end surface and/or the outer peripheral end surface in the glass substrate for the magnetic recording medium, the cleaning of the glass substrate surface can be achieved to a high level, while the glass substrate for the magnetic recording medium superior in deflection strength can surely be obtained. In this respect, the surface roughness of the chamfered portion and/or the side-wall portion of the inner peripheral end surface and/or the outer peripheral end surface in the glass substrate for the magnetic recording medium is more preferably set to Ra of 0.001 to 0.03 μm and Rmax of 0.5 μm or less, where Ra is representative of center-line mean roughness, where Rmax is defined as a maximum height representative of a difference between a highest point and a lowest point, (defined in Japanese Industrial Standard JIS B 0601).

As aforementioned, since the surface of the glass substrate for the magnetic recording medium is cleaned to a high level and the deflection strength is enhanced, in the magnetic recording medium, foreign particles attributed to the end surface fail to stick to the glass substrate surface. No defect arises on the thin film formed on the glass substrate surface, and the glide height can be lowered.

In the present invention, even if the flying height of the head is lowered, the regeneration error attributed to thermal asperity or the impossibility of regeneration is prevented. Therefore, the magnetic recording medium for the magnetic resisting head (the magnetro-resistive head) (MR head) or the giant magnetic resisting head (the magnetro-resistive head) (GMR head) can be obtained.

Furthermore, the magnetic recording medium superior in magnetic characteristics can be obtained.

According to the fifth aspect, by the rotary motion of the rotary support and the rotary brush, the inner peripheral end surface or the like can be polished remarkably efficiently. A high-precision, high-efficiency polishing can be performed without damaging the polished surface. Moreover, the rotary motion of the rotary brush allows the abrasive liquid to circulate in a tank, and prevents the abrasive from being deposited. Additionally, in addition to the rotary brush, means for circulating the abrasive liquid may further be provided.

According to the sixth aspect, similar advantages to the first aspect can be achieved.

In addition, by combining the supply of the abrasive liquid containing the free abrasive grains with the polishing brush or the like for the inner and outer peripheral end surfaces of the glass substrate, especially the inner peripheral end surface of the glass substrate or the like difficult to be polished with high precision can efficiently be smoothed with simple method, and at lower cost and high level. Moreover, as compared with the polishing by an immersion system in which the entire glass substrate is immersed in the abrasive liquid, a fresh abrasive liquid can constantly be supplied to the end surface of the glass substrate, polishing speed is satisfactory, reproducibility is high and high precision polishing is possible.

Moreover, not only the chamfered portion but also the side-wall portion in the inner and outer peripheral end surfaces of the glass substrate can simultaneously be smoothed at low cost, good efficiency and high level. If both the chamfered portion and the side-wall portion are smooth, the effect of the present invention is further enlarged.

According to the polishing method of the present invention, the glass substrate can be obtained with good reproducibility in which the surface roughness of the inner and outer peripheral end surfaces of the glass substrate can be set in order to prevent thermal asperity, that is, set to Ra in a range of 0.001 to 0.5 μm, preferably 0.001 to 0.1 μm, Rmax in a range of 0.01 to 4 μm, preferably 0.01 to 2 μm, more preferably 0.01 to 1 μm.

Moreover, by stacking and polishing a plurality of glass substrates so that the inner peripheral end surface and/or the outer peripheral end surface of the plurality of glass substrates are simultaneously polished, cost reduction and efficiency enhancement can be realized.

Furthermore, by supplying (spraying or otherwise) the abrasive liquid containing the free abrasive grains at a flow rate of 500 to 3000 ml/min and performing the polishing, the polishing can be performed while the abrasive liquid is constantly interposed between the inner peripheral end surface and/or the outer peripheral end surface of the glass substrate, and the polishing brush or the polishing pad, so that high-precision polishing is accomplished, and polishing defects such as scratches made by the direct contact of the polishing brush or the like with the glass substrate can be prevented. When the flow rate for supplying the abrasive liquid is less than 500 ml/min, the abrasive liquid insufficiently spreads over the polishing brush or the like, and this results in the direct contact of the polishing brush or the like with the glass substrate and disadvantageously causes the polishing insufficiency or defect (scratch). Moreover, when the flow rate for supplying the abrasive liquid exceeds 3000 ml/min, the polishing speed disadvantageously fails to rise.

In order to prevent the polishing insufficiency or defect from occurring by the abrasive liquid shortage, the number of revolutions of the polishing brush or the polishing pad may be set in a range of 100 to 15000 rpm.

The polishing brush bristles are inclined (disposed, planted, or otherwise) with respect to the plane vertical to the rotation shaft, the polishing brush is rotated so that the abrasive liquid is drawn into the circular hole portion of the plurality of stacked glass substrates, the polishing insufficiency or defect can be prevented from occurring by the abrasive liquid shortage, and the high-precision polishing is therefore possible.

For example, during the polishing of the inner peripheral end surface with a small hole diameter by the rotary brush, there is a possibility that the abrasive liquid is scattered by the rotary brush rotating at high speed, or that the periphery of the rotary brush is brought in a vacuum state to reject the abrasive liquid and the abrasive liquid insufficiently spreads over the polished surface. However, by the arrangement of the inclined bristles, the rotation in the specific direction, or the control of the flow rate of the sprayed abrasive liquid, the polishing insufficiency or defect can be prevented from occurring because of liquid shortage.

The inclination angle of the polishing brush bristles is preferably in a range of 2° to 30°. By setting the inclination angle of the bristles to this range, the fluidity of the abrasive liquid is promoted, the fresh abrasive liquid can constantly be supplied, and the polishing efficiency, reproducibility and precision can be enhanced. When the inclination angle of the bristles is less than 2°, the abrasive liquid insufficiently spreads over the polished surface and the defect ratio by the polishing defect unfavorably increases. Moreover, when the inclination angle of the bristles exceeds 30°, the polishing speed is disadvantageously retarded.

The polishing brush bristles are, for example, planted in a helical shape on the rotation shaft. By setting the viscosity of the abrasive liquid containing the free abrasive grains in a range of 1.5 to 25 cps (20° C.), the polishing efficiency, reproducibility and precision can be enhanced, while the possibility of scratching or damaging the polished surface can remarkably be reduced. From the similar viewpoint, the viscosity of the abrasive liquid containing the free abrasive grains is more preferably in a range of 1.8 to 5 cps (20° C.).

According to the seventh aspect, the inner peripheral end surface of the glass substrate difficult to be polished with high precision can be smoothed with a simple device, and at lower cost, good efficiency and high level as compared with other devices.

According to the eighth aspect, the outer peripheral end surface of the glass substrate or the like can be smoothed with the simple device, and at lower cost, good efficiency and high level as compared with other devices. Additionally, by using a plurality of rotary brushes in contact with the outer periphery of the plurality of stacked glass substrates, the efficiency can be enhanced.

Moreover, the glass substrate surface can be cleaned to a high level, and the glass substrate for the magnetic recording medium superior in deflection strength can be manufactured.

Furthermore, since the surface of the glass substrate for the magnetic recording medium is cleaned to a high level and the deflection strength is enhanced, in the magnetic recording medium, foreign particles attributed to the end surface fail to stick to the glass substrate surface. No defect arises on the thin film formed on the glass substrate surface, and the glide height can be lowered.

BRIEF DESCRIPTION OF THE DRAWINGS

FIG. 8A is a front view, and FIG. 8B is a partial sectional view.

DETAILED DESCRIPTION OF THE PREFERRED EMBODIMENTS

FIRST EXAMPLE

Figure 1:
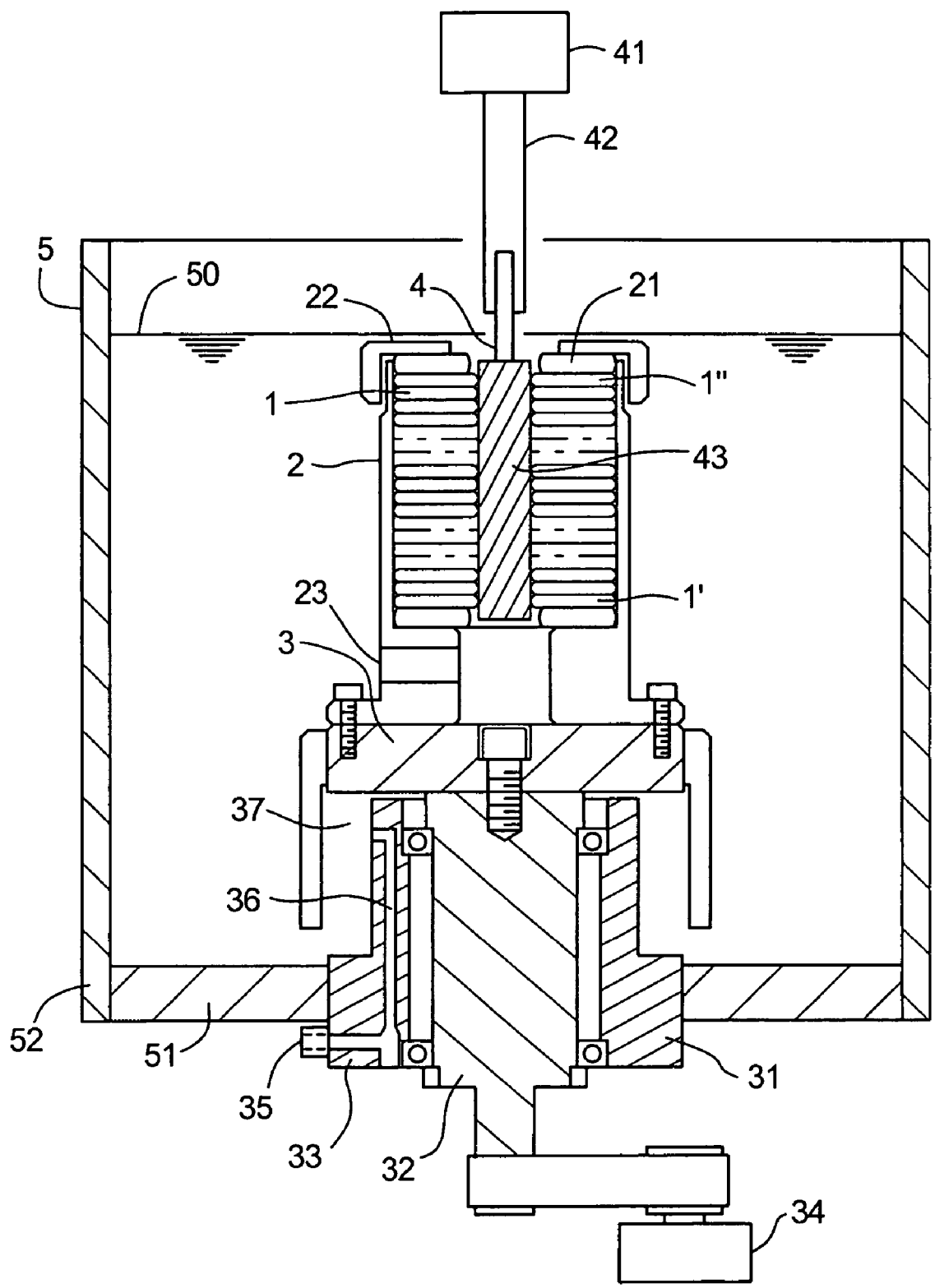
FIG. 1 is a sectional view showing a polishing device according to the first embodiment of the present invention.
Figure 2:
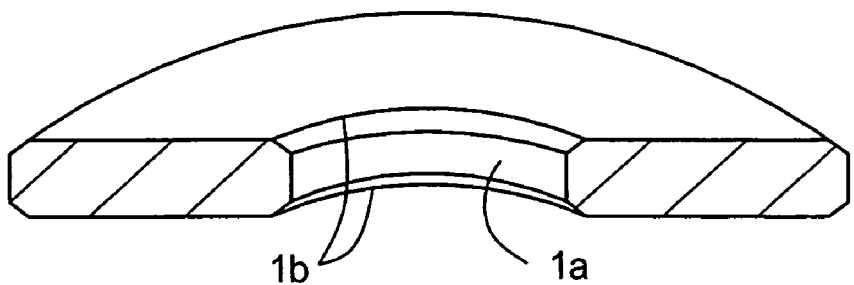
FIG. 2 is a partially cutaway perspective view of a glass substrate for a magnetic recording medium.

FIG. 1 is a sectional view of a polishing device according to the first embodiment of the present invention, and FIG. 2 is a perspective view of a cut glass substrate for a magnetic disc. A case where a polishing method and a polishing device according to the present invention are applied to polishing of an inner peripheral end surface of a magnetic disc glass substrate will be described with reference to the drawings.

First, an example of the polishing device in accordance with the first embodiment of the present invention will be described.

In FIG. 1, numeral 1 denotes objects to be polished or magnetic disc glass substrates (hereinafter referred to as MD substrate), 2 denotes a substrate case in which a large number of MD substrates 1 are stored while immersed in an abrasive liquid, 3 denotes a rotary support for rotatably fixing/holding the substrate case 2, 4 denotes a rotary brush inserted in a hole defined by inner peripheries of a large number of stacked MD substrates 1, and 5 denotes an abrasive liquid container for storing the abrasive liquid.

The substrate case 2 has a mechanism in which by fastening a fastening cover 22 via a collar 21 from above in an axial direction, the MD substrates 1 are held by a friction coefficient among main surfaces of the MD substrates 1 without being influenced by rotation of the substrate case 2 and the rotary brush 4. Additionally, an abrasive liquid flowing hole 23 is formed in an appropriate portion of the substrate case 2 in such a manner that the abrasive liquid can circulate inside and outside the case.

The rotary support 3 is connected to a rotation shaft 32 of a rotation shaft unit 31 which is hermetically attached to a center portion of a bottom plate 51 of the abrasive liquid containers 5, and can be rotated by a rotary drive unit 34 by which the rotation shaft 32 is operated to rotate both forward and backward. Additionally, for the rotary drive unit 34, the number of revolutions is variable, and an appropriate number of revolutions can be selected in accordance with a polishing purpose. Moreover, by supplying air via an air supply path 36 from an air supply port 35 which is made in a rotation shaft cover 33 in the rotation shaft unit 31, an air seal layer 37 is formed to prevent the abrasive liquid from flowing into the rotation shaft 32. The abrasive liquid container 5 has a cylindrical side wall 52 hermetically attached to an outer periphery of the disc-shaped bottom plate 51, and contains therein an abrasive liquid 50.

The rotary brush 4 is connected to a rotation shaft 42 of a rotary drive unit 41, and operated to rotate both forward and backward. In an initial state, the rotary brush 4 is set in such a manner that a rotation center position of the rotary brush 4 coincides with a rotation center of the substrate case 2. Moreover, for the rotary brush 4, to regulate contact lengths of bristles 43 onto the MD substrates 1, the pushing against the inner peripheral end surfaces of the MD substrates 1, i.e., the amount of pushing in a direction perpendicular to a brush rotation shaft can be adjusted by a mechanism (not shown) using an air cylinder or the like. A cam mechanism (not shown) allows the rotary brush 4 to push against the inner peripheral end surfaces and simultaneously to reciprocate along the brush rotation shaft while swinging.

Figure 5:
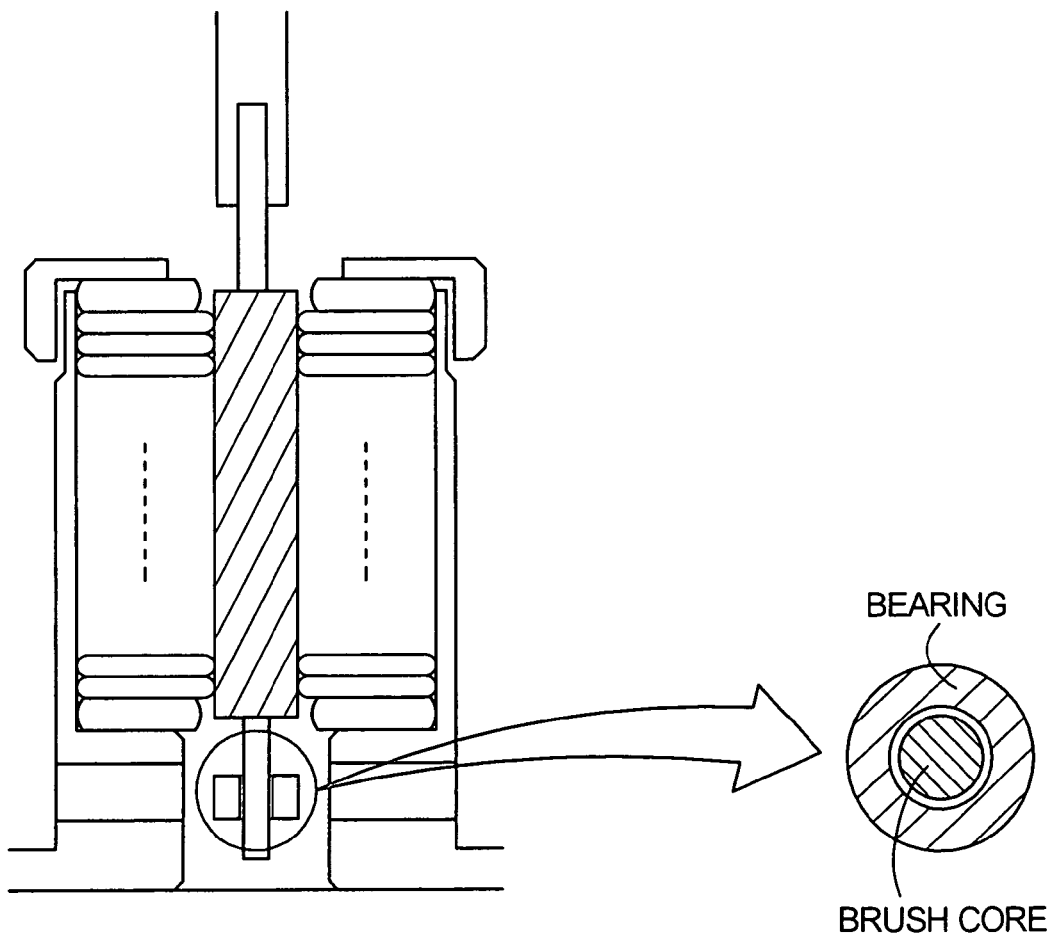
FIG. 5 is a sectional view showing a polishing operation of an inner peripheral end surface.

As shown in FIG. 5, by inserting an end of the rotary brush 4 opposite to the rotary drive unit 41 into a bearing to which the rotation shaft is fixed, polishing can be performed while the rotation shaft is not deviated at the time of polishing of the end surfaces. Therefore, a high-precision polishing can be performed without any dispersion in surface roughness and size. As the bearing, there can be used a known bearing such as a bearing, a ball bearing, a roller bearing or a plain bearing. Incidentally, the bearing can also play a role as a guide member at the time of the insertion of the rotary brush. In this case, the inner diameter of the inlet of the bearing can preferably be increased so that the rotation shaft of the rotary brush can easily be inserted into the bearing. A plurality of bearings can be disposed, and the bearing can also be disposed around the rotation shaft on the side of the rotary drive unit.

As a material of the bristle 43 of the rotary brush 4, a nylon fiber curled in a snaking shape (diameter of 0.1 to 0.3 mm, length of 5 to 10 mm) is used, but instead of the nylon fiber, a vinyl chloride fiber, a swine bristle, a piano wire, a stainless fiber, or the like may be used. If a fiber low in hardness or a fiber high in flexibility is used, a grinding force can be prevented from being excessively enlarged by elastic deformation of the bristle, and scratching or damaging can effectively be prevented. Moreover, since the curled fiber has good contact characteristics for an indentation or the like, for example, a chamfered portion 1b of the MD substrate 1 shown in FIG. 2 can efficiently be polished. However, if the polishing efficiency of the chamfered portions 1b is not made much of, a straight fiber without being curled may be used. Additionally, if the bristle 43 for use is formed by molding a resin mixed with an abrasive into an abrasive containing bristle, polishing rate can further be enhanced.

Cerium oxide is used as the abrasive, but iron oxide, magnesium oxide, zirconium oxide, manganese oxide or another abrasive can be used. Since an abrasive close to a material of a polished object (MD substrate) is preferable, cerium oxide is preferable for the glass substrate. If the abrasive is too hard, the end surface of the glass substrate is unpreferably damaged, and if the abrasive is too soft, it is unpreferably impossible to bring the end surface of the glass substrate to a mirror surface. Additionally, the average grain size is preferably 1 to 5 µm. With the average grain size of less than 1 µm, the abrasive has a weak force for grinding the glass substrate, and the tip end of the rotary brush 4 frequently abuts on and directly grinds the glass substrate end surface. Therefore, it is difficult to control a chamfered configuration of the MD substrate, and a portion between the side-wall portion and the chamfered portion of the end surface undesirably sags. If the average grain size exceeds 5 µm, the particle diameter of the abrasive is large, so that the surface becomes coarse and the abrasive is liable to precipitate on the bottom of the abrasive liquid container, and polishing may be performed without interposing the abrasive between the rotary brush and the glass substrate, which is undesirable because a desired surface roughness cannot be obtained.

An example of a polishing method using the aforementioned polishing device will next be described.

First, the rotary brush 4 is retreated from the substrate case 2 by an appropriate amount, and a large number of MD substrates 1 are clamped in the substrate case 2 by disposing the collars 21 on the top and bottom of the MD substrates 1 and fitting the fastening cover 22. In this case, a core deviation in the hole defined by the inner peripheries of the MD substrates 1 is determined by a clearance which is formed by a dimensional difference between the inner periphery of the substrate case 2 and the outer peripheries of the MD substrates 1. The clearance needs to be regulated in accordance with the operability and the roundness of the inner periphery of the substrate case 2, but an adequate clearance is in a range from a loose fit to an intermediate fit in JIS B 0401 (1986).

The substrate case 2 in which a large number of MD substrates 1 are set is mounted on the rotary support 3. The MD substrates 1 have inner and outer peripheries chamfered or processed otherwise before being set.

Subsequently, the rotary brush 4 on the same line as the rotation center of the substrate case 2 is inserted into the inner peripheral portion of the MD substrates 1 as shown in FIG. 1. The stop position of the rotary brush 4 is determined in such a manner that the MD substrates 1 from the lowermost substrate 1' to the uppermost substrate 1" are stacked within a range in which the bristles 43 of the rotary brush 4 are set.

Subsequently, the abrasive liquid container 5 is filled with only an appropriate amount of abrasive liquid 50. With the appropriate amount, the top end surface of the fastening cover 22 of the MD substrates 1 is positioned slightly below a liquid surface. The amount is appropriately determined in accordance with the polishing purpose. The abrasive liquid may be filled before or at the same time the rotary brush 4 is inserted in the hole defined by the inner peripheries of the MD substrates 1.

Subsequently, the pushing amount of the rotary brush 4 is adjusted, so that the bristles 43 of the rotary brush 4 abut on the inner peripheral end surfaces of the MD substrates 1. In a case where the bristles 43 are formed of curled nylon fibers, the pushing amount is adjusted in such a manner that tip ends of the bristles 43 are pushed against the polished surfaces of the MD substrates 1 by about 1 to 5 mm.

Additionally, the contact pressure of the brush by the pushing against the inner peripheral end surfaces of the MD substrates 1 is preferably regulated by the mechanism using the air cylinder or the like. Specifically, for elastic bristles, the air pressure of the air cylinder is preferably in a range of 0.05 to 0.1 MPa, while for soft bristles, the air pressure of the air cylinder is preferably in a range of 0.05 to 1 MPa.

Subsequently, while the rotary support 3 and the rotary brush 4 are rotated in reverse to each other, polishing is performed. In this case, the preferable number of revolutions of the rotary brush 4 is 1000 to 20000 rpm at the time of idling. In the embodiment, the number of revolutions of the rotary support 3 is 60 rpm, the number of revolutions of the rotary brush 4 in the abrasive liquid is 4000 rpm (10000 rpm at the time of idling), and polishing time is about ten minutes. After a predetermined amount has been polished, the device is stopped, the abrasive liquid 50 is discharged to an amount to which the substrate case 2 can be taken out, and the substrate case 2 is actually taken out. Additionally, when the substrate case 2 is removed, the rotary brush 4 needs to be moved to a position where the rotary brush 4 does not interfere with attachment/detachment of the substrate case 2. Finally, from the taken substrate case 2, the MD substrates 1 are taken in a sequence reverse to a sequence in which the MD substrates 1 are set.

Evaluation

The surface roughness of the inner peripheral end surface (the chamfered portion 1b and/or the side-wall portion 1a) of the glass substrate obtained in the method described above was Rmax of 0.5 µm and Ra of 0.03 µm.

SECOND EXAMPLE

A glass substrate for a magnetic recording medium and the magnetic recording medium were manufactured through the following processes.

(1) First Sanding Process

First, glass substrates formed of aluminosilicate glass cut in disc shapes being 66 mm and 96 mm in diameter and 1.1 mm and 1.4 mm in thickness from a sheet glass formed in a down drawing process with a grinding wheel were ground and processed with a relatively coarse diamond wheel to mold substrates 95 mm (3.5 inches) and 65 mm (2.5 inches) in diameter and 0.8 mm and 0.6 mm in thickness.

In this case, instead of using the down drawing process, molten glass may directly be pressed using upper, lower and barrel molds to obtain a glass disc.

Additionally, as the aluminosilicate glass used was a chemical reinforcing glass which mainly contains, in terms of mol %, 57 to 74% of $SiO_2$, 0 to 2.8% of $ZrO_2$, 3 to 15% of $Al_2O_3$, 7 to 18% of $LiO_2$, and 4 to 14% of $Na_2O$.

Subsequently, the glass substrate was subjected to a sanding processing. The sanding process has a purpose of enhancing dimensional precision and configuration precision. The sanding processing was performed using a lapping machine with an abrasive grain size of #400.

Specifically, by using an alumina abrasive grain with a grain size of #400, setting a load L to about 100 kg, and rotating inner and outer rotary gears, opposite surfaces of the glass substrate held in a carrier were lapped to provide a face precision of 0 to 1 μm and a surface roughness Rmax (measured according to JIS B 0601) of about 6 μm.

Subsequently, a circular hole (diameter of 20 mm) was made in a center portion of the glass substrate using a cylindrical wheel, and outer and inner peripheral end surfaces were subjected to a predetermined chamfer processing. At the time, the surface roughness of the inner or outer peripheral end surface of the glass substrate was about 14 μm in Rmax.

(2) End Surface Polishing Process

Subsequently, the inner peripheral end surface of the glass substrate was polished using the polishing device and the polishing method shown in the first example.

Additionally, when the end surfaces of the stacked glass substrates are polished, in order to avoid scratches or the like on the main surface of the glass substrate more carefully, the end surface polishing process is preferably performed before a first polishing process described later, or before and after a second polishing process.

The glass substrate with the end surfaces polished as aforementioned was cleaned with water.

(3) Second Sanding Process

Subsequently, lapping was performed by using the lapping machine and an alumina abrasive grain with a grain size of #1000, setting the load L to about 100 kg, and rotating the inner and outer rotary gears, so that the surface roughness Rmax of the opposite surfaces of the glass substrate was about 2 μm.

After completing the sanding processing, the glass substrate was successively immersed and cleaned in cleaning tanks of neutral detergent and water.

(4) First Polishing Process

Subsequently, the first polishing process was applied. For a purpose of removing residual scratches and deformation after the aforementioned sanding processes, the fist polishing process was performed using a polishing device.

Specifically, the first polishing process was carried out using a hard polisher (cerium pad MHC15 manufactured by RODEL NITTA) as a polisher (polishing cloth) in the following polishing conditions:

Abrasive liquid: cerium oxide plus water
Load: 300 g/cm² (L=238 kg)
Polishing time: 15 minutes
Removed amount: 30 μm
Number of revolutions of lower platen: 40 rpm
Number of revolutions of upper platen: 35 rpm
Number of revolutions of inner gear: 14 rpm
Number of revolutions of outer gear: 29 rpm After completing the first polishing process, the glass substrate was successively immersed and cleaned in cleaning tanks of neutral detergent, pure water, pure water, IPA (isopropyl alcohol), and IPA (steam drying)

(5) Second Polishing Process

Subsequently, the second polishing process was performed by using the polishing device used in the first polishing process and replacing the hard polisher with a soft polisher (Polylux manufactured by Speed Fam Co., Ltd.). The polishing conditions were the same as those in the first polishing process except that the load was 100 g/cm², the polishing time was five minutes and the removed amount was 5 μm.

After completing the second polishing process, the glass substrate was successively immersed and cleaned in cleaning tanks of neutral detergent, neutral detergent, pure water, pure water, IPA (isopropyl alcohol), and IPA (steam drying). Additionally, ultrasonic waves were applied to the cleaning tanks.

(6) Chemical Reinforcing Process

After completing the grinding and polishing processes as aforementioned, the glass substrate was subjected to chemical reinforcement.

The chemical reinforcement was performed by mixing potassium nitrate (60%) and sodium nitrate (40%) to prepare a chemical reinforcing solution, heating the chemical reinforcing solution to 400° C., and immersing the glass substrate cleaned and preheated to 300° C. in the chemical reinforcing solution for about three hours. In order to chemically reinforce the entire surface of the glass substrate, immersion was performed while a plurality of glass substrates were held at the end surfaces in a holder.

Through the immersion processing in the chemical reinforcing solution, lithium ions and sodium ions in a glass substrate surface layer were substituted for sodium ions and potassium ions in the chemical reinforcing solution, respectively, to reinforce the glass substrate.

The thickness of a compression stress layer formed on the surface layer of the glass substrate was about 100 to 200 μm.

After the chemical reinforcement was completed, the glass substrate was immersed in a water tank of 20° C., quenched and held for about ten minutes.

The quenched glass substrate was immersed and cleaned in concentrated sulfuric acid heated to about 40° C.

After completing the cleaning in the sulfuric acid, the glass substrate was successively immersed and cleaned in cleaning tanks of pure water, pure water, IPA (isopropyl alcohol), and IPA (steam drying). Additionally, ultrasonic waves were applied to the cleaning tanks.

Evaluation

The surface roughness Ra of the inner peripheral end surface of the glass substrate for the magnetic recording medium obtained through the above-mentioned processes was 0.028 μm on the chamfered portion 1b and 0.030 μm on the sidewall portion 1a shown in FIG. 2. Moreover, the surface roughness Ra of the main surface of the glass substrate was 0.3 to 0.7 nm (measured with the interatomic force microscope (AFM)). Observation of the end surface with an electronic microscope (4000 times) showed a mirror surface state.

Additionally, no foreign particles or cracks were found on the inner peripheral end surface of the glass substrate for the magnetic recording medium, and for the glass surface, no particles causing foreign particles or thermal asperity were found.

Figure 3:
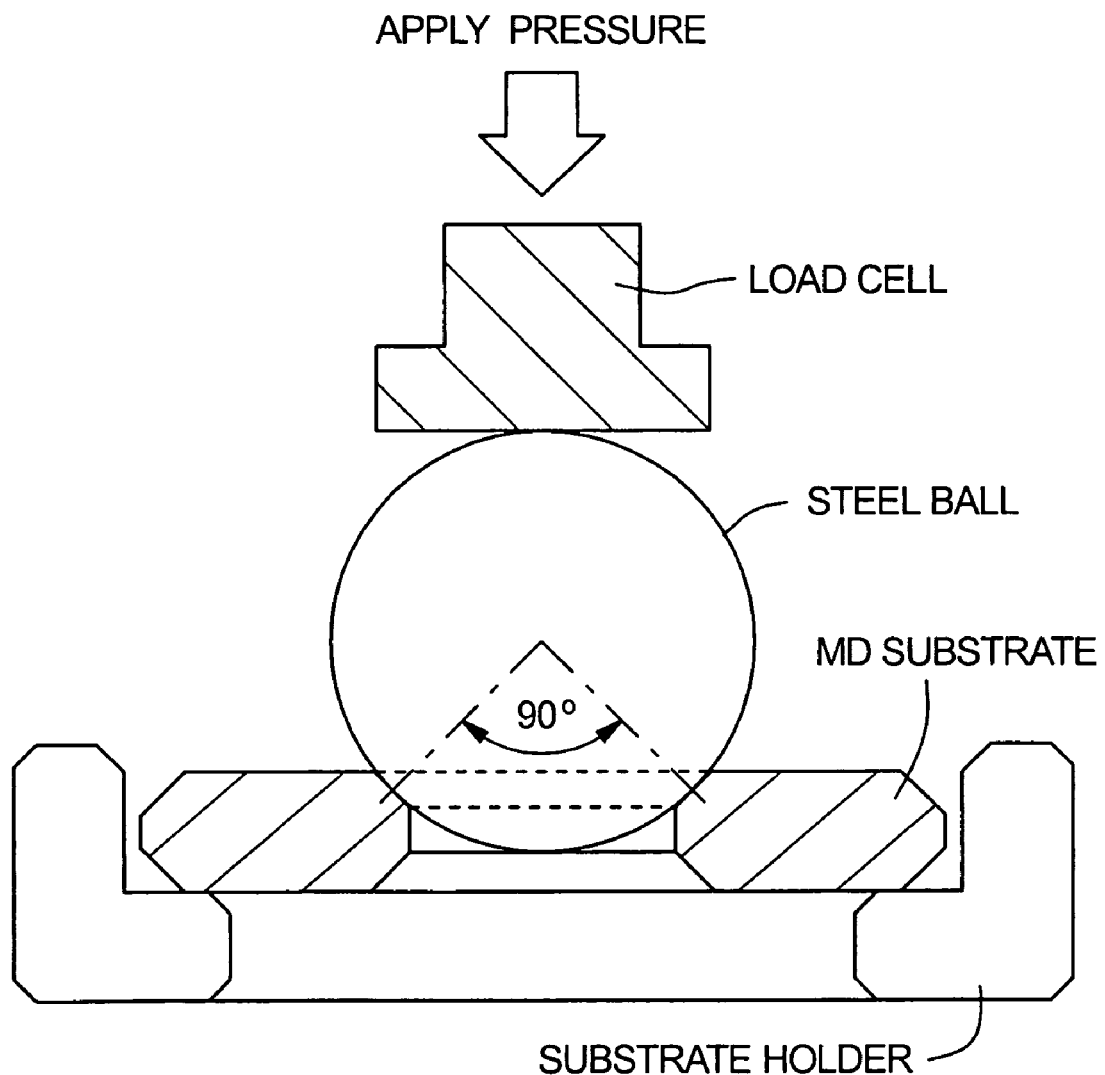
FIG. 3 is a sectional view of a deflection strength tester.

Furthermore, when the deflection strength was measured using a deflection strength tester (Shimazu Autograph DDS-2000) shown in FIG. 3, it was 12 to 20 kg. Additionally, when the deflection strength was measured in the same manner while changing a chemical reinforcing level, it was about 10 to 25 kg.

(7) Magnetic Disc Manufacture Process

A texture layer of sputtered Aluminum nitride (AlN), a Cr underlying (primary) layer, a CrMo underlying (primary) layer, a CoPtCrTa magnetic layer, and a Carbon protective layer were successively formed on each of opposite surfaces of the glass substrate for the magnetic disc obtained through the processes described above using an in-line type sputtering device (apparatus), to obtain an MR head magnetic disc.

For the resultant magnetic disc, it was confirmed that no defects on the magnetic layers or other films were generated by foreign particles. Additionally, a glide test showed neither hit (hit of the head on a magnetic disc surface) nor crush (crush of the head against protrusions on the magnetic disc surface). Furthermore, a regeneration test with the magnetic resisting head (the magnetro-resistive head) showed no regeneration error by the thermal asperity.

THIRD EXAMPLE

Figure 4:
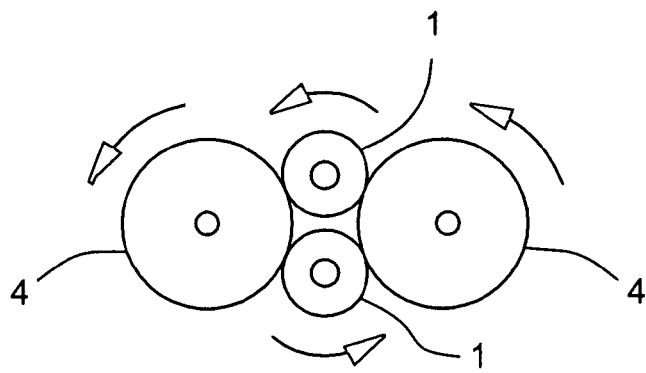
FIG. 4 is a plan view showing a polishing operation of an outer peripheral end surface.

A glass substrate for a magnetic recording medium and the magnetic recording medium were obtained in the same manner as the second example, except that, as shown in FIG. 4, the outer peripheral end surfaces of the glass substrates were polished (sprayed with or immersed in the abrasive liquid) for 30 minutes by rotating the rotary brush 4 with a diameter of 230 mm (bristle length of 10 to 30 mm) at 700 to 1000 rpm and by rotating the stacked MD substrates 1 at 60 rpm as shown in FIG. 4, before the inner peripheral end surfaces were polished.

As a result, the surface roughness of the outer peripheral end surface was 0.6 µm in Rmax and 0.04 µm in Ra, while the surface roughness of the inner peripheral end surface was 0.5 µm in Rmax and 0.03 µm in Ra. Moreover, when the deflection strength was measured using the deflection strength tester (Shimazu Autograph DDS-2000) shown in FIG. 3, it was about 18 to 22.5 kg. Additionally, when the deflection strength was measured in the same manner while changing the chemical reinforcing level, it was about 10 to 25 kg.

Additionally, in a case where the polishing of the inner and outer peripheral end surfaces was not performed, when the deflection strength was measured in the same manner, it was about 5 kg or less. In a case where only the outer peripheral end surface was polished, when the deflection strength was measured in the same manner, it was about 5 to 9 kg.

Since the deflection strength indicates almost the same value when the inner and outer peripheral end surfaces are polished and when only the inner peripheral end surface is polished, it can be supposed that the state of the inner peripheral end surface exerts a strong influence on the deflection strength. Moreover, it is appreciated that the value of the deflection strength can be regulated according to the chemical reinforcing level.

FOURTH EXAMPLE

A glass substrate for a magnetic recording medium and the magnetic recording medium were obtained in the same manner as the second example, except that a polishing pad was used instead of the rotary brush to polish the inner and outer peripheral end surface.

As a result, the surface roughness Ra of the outer peripheral end surface was 0.03 µm on the chamfered portion and 0.01 µm on the side-wall portion. Additionally, the surface roughness Ra of the inner peripheral end surface was 0.03 µm on the chamfered portion and 0.01 µm on the side-wall portion.

FIRST COMPARATIVE EXAMPLE

A glass substrate for a magnetic recording medium and the magnetic recording medium were obtained in the same manner as the second example, except that a diamond wheel was used instead of the rotary brush to polish the inner peripheral end surface.

As a result, the surface roughness was in the same degree as the surface roughness of the inner and outer peripheral end surfaces immediately after the chamfering processing in the second example. Additionally, when the end surface was observed with the electronic microscope (4000 times), a coarse ground state was found and remarkably poor smoothness was provided.

SECOND COMPARATIVE EXAMPLE

A glass substrate for a magnetic recording medium and the magnetic recording medium were obtained in the same manner as the second example, except that the etching processing of the inner and outer peripheral end surfaces were performed by chemical etching, instead of using the rotary brush.

As a result, the surface roughness was deteriorated by about 0.1 µm in Ra and about 0.7 µm in Rmax as compared with before the etching processing. Additionally, when the end surface was observed with the electronic microscope (4000 times), cracks were etched, enlarged and indented to easily catch particles. Poor smoothness and residual cracks were found.

FIFTH AND SIXTH EXAMPLES

Glass substrates for magnetic discs and the magnetic discs were obtained in the same manner as the second example, except that soda-lime glass (fifth example) and soda aluminosilicate glass (sixth example) were used instead of aluminosilicate glass.

As a result, when the soda-lime glass was used, the outer and inner peripheral end surfaces of the glass substrate were slightly rougher than when aluminosilicate glass was used, which was not a practical problem.

SEVENTH EXAMPLE

A underlying (primary) layer formed of Al (thickness of 50 angstroms)/Cr (1000 angstroms)/CrMo (100 angstroms), a magnetic layer of CoPtCr (120 angstroms)/CrMo (50 angstroms)/CoPtCr (120 angstroms), and a Cr (50 angstroms) protective layer were formed on each of the opposite surfaces of the magnetic disc glass substrate obtained in the second example using the in-line type sputtering device (apparatus).

The substrate was immersed in an organic silicon compound solution (mixed liquid of water, IPA and tetraethoxysilane) with fine silica particles (particle diameter of 100 angstroms) dispersed therein, and calcined to form the protective layer formed of $SiO_2$ having a texture function thereon. Furthermore, dipping processing was applied onto the protective layer using lubricant of perfluoropolyether to form a lubricant layer. The magnetic disc for MR head was thus obtained.

For the magnetic disc, the same as in the second example was confirmed.

EIGHTH EXAMPLE

A magnetic disc for a thin-film head was obtained in the same manner as the seventh example, except that the underlying (primary) layer was Al/Cr/Cr, and the magnetic layer was CoNiCrTa.

NINTH TO TWELFTH EXAMPLES, THIRD AND FOURTH COMPARATIVE EXAMPLES

Subsequently, glass substrates were prepared in the same manner as the first example, except that the type or the like of a free abrasive grain was approximately selected and that the viscosity of the abrasive liquid containing the free abrasive grains used in the end surface polishing process described above was changed to 1.3 cps (third comparative example), 1.5 cps (ninth example), 5 cps (tenth example), 10 cps (eleventh example), 25 cps (twelfth example), and 27 cps (fourth comparative example). Results are shown in Table. For surface states, results of surface observation by the microscope are shown in circles when there are no scratches or damages and in crosses when there are scratches and damages. As shown in the table 1, scratches and damages are observed on the end surfaces at the abrasive liquid viscosity of 1.3 cps or 27 cps. It is supposed that when the viscosity is less than 1.5 cps, portions are generated in which no abrasive grain is interposed between the brush and the glass substrate at the time of polishing, the brush directly abuts on the glass substrate, and damages are made. Moreover, when the viscosity exceeds 25 cps, the high viscosity results in an increase of a load on the rotary drive unit for rotating the rotary brush, and facilitates coherence of the abrasive. At the time of polishing, the abrasive adhering to the abrasive liquid container or the like is again interposed between the brush and the glass substrate to damage the surfaces.

The rotary support 3 is connected to the rotation shaft 32 of the rotation shaft unit 31, and can be rotated both forward and backward by the rotary drive unit 34 for rotating/operating the rotation shaft 32.

The rotary brush 4 is connected to the rotation shaft 42 of the rotary drive unit 41, and can be rotated both forward and backward. However, during polishing, the brush is usually rotated in a direction in which the abrasive liquid is drawn downward (downward in a state in which MD substrates are stacked).

Additionally, the rotary brush 4 is fixed, and the pushing amount can be adjusted by moving the substrate case 2.

Figure 6:
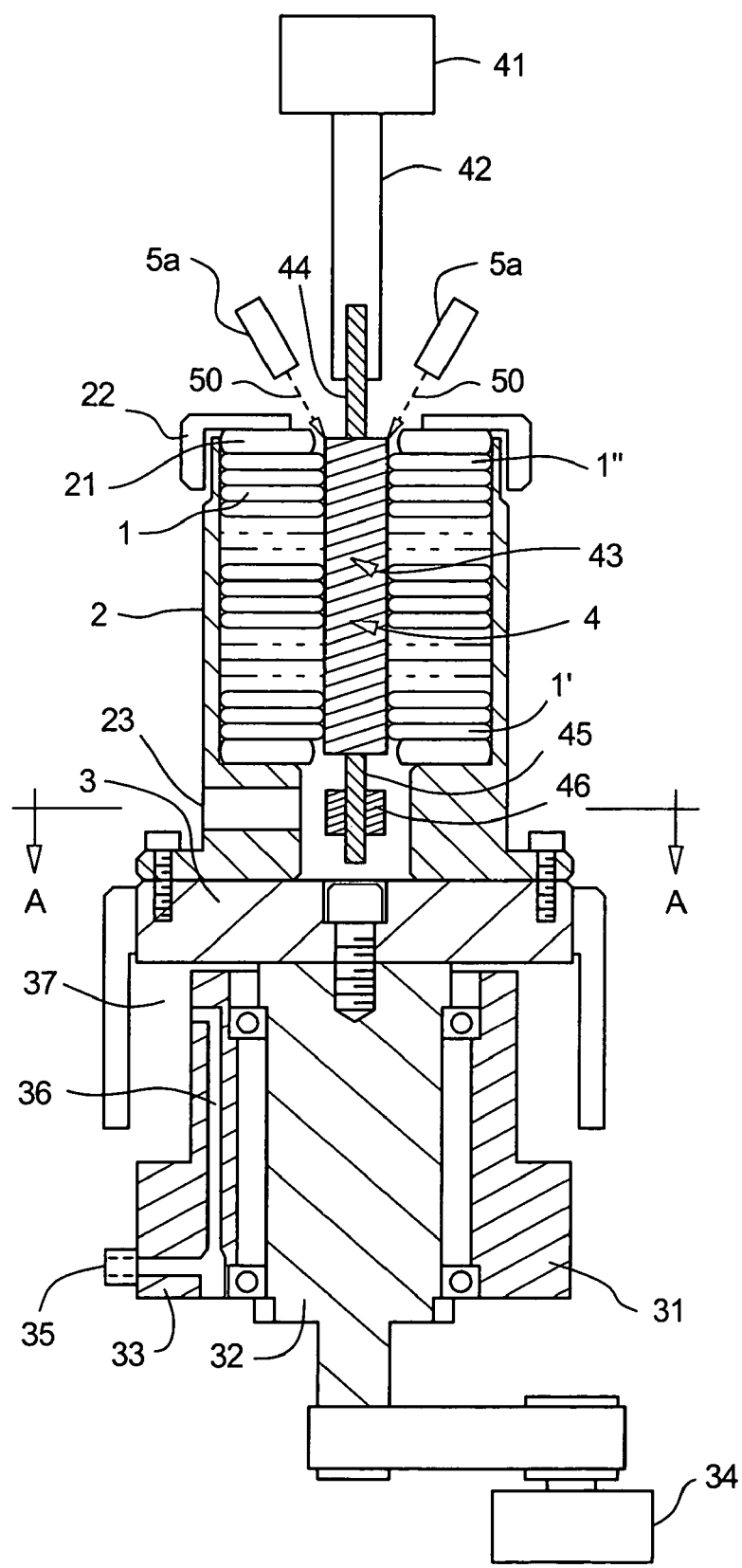
FIG. 6 is a sectional view showing a polishing device according to the second embodiment of the present invention.
Figure 7:
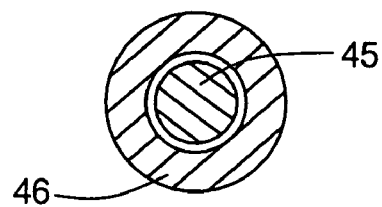
FIG. 7 is a sectional view of a bearing part along line A-A in FIG. 6.

As shown in FIGS. 6 and 7, the rotary brush 4 is provided with at least a bearing 46 which is fixed to a rotation shaft 45 disposed opposite to a rotation shaft 44 on the side of the rotary drive unit, polishing can be performed by inserting the rotation shaft into the bearing without any deviation in the rotation shaft even during the polishing of the end surface, and high-precision polishing can advantageously be performed without any dispersion in surface roughness or size. As the bearing, known bearings such as a bearing, a ball bearing, a roller bearing, and a slide bearing can be used. Additionally, the bearing also serves as a guide member dur-

TABLE 1

|  | THIRD COMPAR. EXAMPLE | NINTH EXAMPLE | TENTH EXAMPLE | ELEVENTH EXAMPLE | TWELFTH EXAMPLE | FOURTH COMPAR. EXAMPLE |
| --- | --- | --- | --- | --- | --- | --- |
| VISCOSITY | 1.3 cps | 1.5 cps | 5 cps | 10 cps | 25 cps | 27 cps |
| SCRATCH | x | ○ | ○ | ○ | ○ | x |

For the magnetic disc, the same as in the seventh example was confirmed.

By immersing and polishing the inner peripheral end surface and/or the outer peripheral end surface in the abrasive liquid containing the free abrasive grains, a sufficient amount of abrasive liquid constantly exists on the end surface, and polishing insufficiency or defect because of liquid shortage is, therefore, prevented from occurring. Moreover, even when elastic bristles are used in the rotary brush, the elasticity of the bristles immersed in the abrasive liquid is moderated by the viscosity resistance or another property of the abrasive liquid, and the bristles fail to collide against the polished surface unnecessarily strong. Therefore, the possibility of scratching or damaging the polished surface can remarkably be reduced. Furthermore, for example, by setting the bristles helically on the rotation shaft, a fresh abrasive liquid can constantly be circulated and supplied to the polished surface. Polishing efficiency, reproducibility and precision can thus be enhanced.

THIRTEENTH EXAMPLE

Figure 8A:
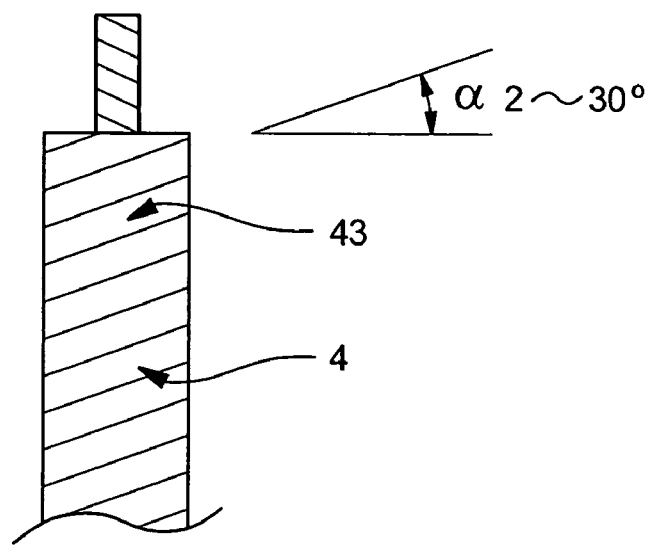
FIGS. 8A, 8B are schematic views showing a rotary brush and a bristle.
Figure 8B:
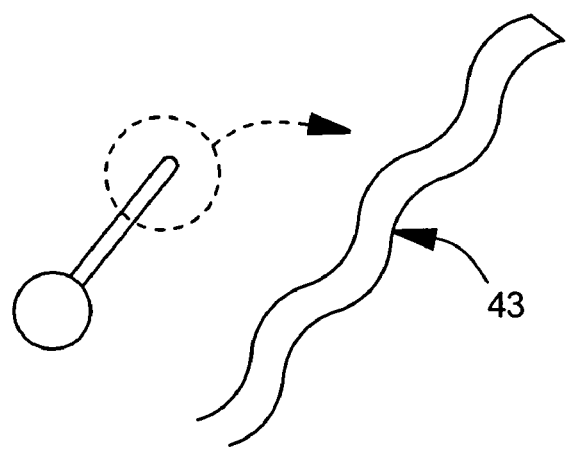

FIG. 6 is a sectional view of the polishing device according to the second embodiment of the present invention, FIG. 7 is a sectional view of a bearing portion along line A-A in FIG. 6, and FIGS. 8A and 8B are schematic views of a rotary brush and bristles. Additionally, the same parts as those of the structure of the polishing device according to the first embodiment shown in FIG. 1 are denoted with the same numerals, and the detailed description thereof is omitted. Numeral 5a denotes an abrasive liquid container for storing the abrasive liquid.

ing the inserting of the rotary brush. In this case, the inlet inner diameter of the bearing can be broadened, and this is preferable because the rotary brush rotation shaft is easily inserted into the bearing. Moreover, a plurality of bearings may be disposed, and the bearing may also be disposed on the rotation shaft on the side of the rotary drive unit.

As shown in FIG. 6, the rotary brush 4 is constituted by helically planting the bristles 43, and the inclination angle of the bristle (inclination angle α of the bristle 43 helically planted as shown in FIG. 8A) is in a range of 2° to 30°. Moreover, as the bristle 43, a nylon fiber curled in a snaking shape as shown in FIG. 8B (diameter of 0.1 to 0.3 mm, length of 5 to 10 mm) is used.

Examples of the polishing pad include soft polishers such as suede and velour, hard polishers such as hard velour, urethane foam and pitch impregnated suede, and the like.

A form of supply of the abrasive liquid by the abrasive liquid container is not especially limited, and for example, blowing, spraying, discharging, applying, or the like is performed using single water flow, shower, waterdrop, or the like.

Additionally, as not shown in FIG. 6, the polishing device of the present embodiment is provided with a abrasive liquid collection unit for collecting the abrasive liquid supplied from the abrasive liquid container, and a circulation mechanism for cleaning the collected abrasive liquid and re-circulating the liquid to the abrasive liquid container.

One example of the polishing method using the polishing device shown in FIG. 6 will next be described, but the description of the similar parts to those of the polishing device of FIG. 1 is omitted.

After inserting and setting the rotary brush 4 into the inner peripheral portion of the MD substrate 1, the abrasive liquid is supplied to the inner periphery of the MD substrate from the abrasive liquid container 5a at a flow rate of 500 ml/min to 3000 ml/min utilizing the downward suction generated by the brush rotation.

Subsequently, the pushing amount of the rotary brush 4 is adjusted, so that the bristles 43 of the rotary brush 4 abut on the inner peripheral end surfaces of the MD substrates 1. In a case where the bristles 43 are formed of curled nylon fibers, the pushing amount is adjusted in such a manner that tip ends of the bristles 43 are pushed against the polished surfaces of the MD substrates 1 by about 1 to 5 mm.

Additionally, the contact pressure of the brush by the pushing against the inner peripheral end surfaces of the MD substrates 1 is preferably regulated by the mechanism using the air cylinder or the like. Specifically, for elastic bristles, the air pressure of the air cylinder is preferably in a range of 0.05 to 0.1 MPa, while for soft bristles, the air pressure of the air cylinder is preferably in a range of 0.05 to 1 MPa.

Subsequently, while the rotary support 3 and the rotary brush 4 are rotated in reverse to each other, polishing is performed. In this case, the preferable number of revolutions of the rotary brush 4 is 1000 to 20000 rpm at the time of idling. In the embodiment, the number of revolutions of the rotary support 3 is 60 rpm, the number of revolutions of the rotary brush 4 in the abrasive liquid is 4000 rpm (10000 rpm at the time of idling), and polishing time is about ten minutes. After a predetermined amount has been polished, the device is stopped, the abrasive liquid 50 is discharged to an amount to which the substrate case 2 can be taken out, and the substrate case 2 is actually taken out. Additionally, when the substrate case 2 is removed, the rotary brush 4 needs to be moved to a position where the rotary brush 4 does not interfere with attachment/detachment of the substrate case 2. Finally, from the taken substrate case 2, the MD substrates 1 are taken in a sequence reverse to a sequence in which the MD substrates 1 are set.

Evaluation

The surface roughness of the inner peripheral end surface (the chamfered portion 1b and/or the side-wall portion 1a) of the glass substrate obtained in the method described above was Rmax of 0.5 μm and Ra of 0.03 μm.

FOURTEENTH EXAMPLE

A glass substrate for a magnetic recording medium and the magnetic recording medium were manufactured through the following processes.

(1) First Sanding Process

First, glass substrates formed of aluminosilicate glass cut in disc shapes being 66 mm and 96 mm in diameter and 1.1 mm and 1.4 mm in thickness from a sheet glass formed in a down drawing process with a grinding wheel were ground and processed with a relatively coarse diamond wheel to mold substrates 95 mm (3.5 inches) and 65 mm (2.5 inches) in diameter and 0.8 mm and 0.6 mm in thickness.

In this case, instead of using the down drawing process, molten glass may directly be pressed using upper, lower and barrel molds to obtain a glass disc.

Additionally, as the aluminosilicate glass used was a chemical reinforcing glass which mainly contains, in terms of mol %, 57 to 74% of $SiO_2$, 0 to 2.8% of $ZrO_2$, 3 to 15% of $Al_2O_3$, 7 to 18% of $LiO2$, and 4 to 14% of $Na_2O$.

Subsequently, the glass substrate was subjected to a sanding processing. The sanding process has a purpose of enhancing dimensional precision and configuration precision. The sanding processing was performed using a lapping machine with an abrasive grain size of #400.

Specifically, by using an alumina abrasive grain with a grain size of #400, setting a load L to about 100 kg, and rotating inner and outer rotary gears, opposite surfaces of the glass substrate held in a carrier were lapped to provide a face precision of 0 to 1 μm and a surface roughness Rmax (measured according to JIS B 0601) of about 6 μm.

Subsequently, a circular hole (diameter of 20 mm) was made in a center portion of the glass substrate using a cylindrical wheel, and outer and inner peripheral end surfaces were subjected to a predetermined chamfer processing. At the time, the surface roughness of the inner or outer peripheral end surface of the glass substrate was about 14 μm in Rmax.

(2) End Surface Polishing Process

As shown in FIG. 4, the rotary brush 4 with a diameter of 230 mmφ (bristle length of 10 to 30 mm) was rotated at 700 to 1000 rpm, the laminated MD substrates 1 were rotated at 60 rpm, the abrasive liquid was supplied only to the substrate outer peripheral end surface and polishing was performed for 15 minutes.

Subsequently, the inner peripheral end surface of the glass substrate was polished using the polishing device and the polishing method shown in the thirteenth example.

Additionally, when the end surfaces of the stacked glass substrates are polished, in order to avoid scratches or the like on the main surface of the glass substrate more carefully, the end surface polishing process is preferably performed before a first polishing process described later, or before and after a second polishing process.

The glass substrate with the end surfaces polished as aforementioned was cleaned with water.

(3) Second Sanding Process

Subsequently, lapping was performed by using the lapping machine and an alumina abrasive grain with a grain size of #1000, setting the load L to about 100 kg, and rotating the inner and outer rotary gears, so that the surface roughness Rmax of the opposite surfaces of the glass substrate was about 2 μm.

After completing the sanding processing, the glass substrate was successively immersed and cleaned in cleaning tanks of neutral detergent and water.

(4) First Polishing Process

Subsequently, the first polishing process was applied. For a purpose of removing residual scratches and deformation after the aforementioned sanding processes, the first polishing process was performed using a polishing device.

Specifically, the first polishing process was carried out using a hard polisher (cerium pad MHC15 manufactured by RODEL NITTA) as a polisher (polishing cloth) in the following polishing conditions:

Abrasive liquid: cerium oxide plus water
Load: 300 g/cm$^2$ (L=238 kg)
Polishing time: 15 minutes
Removed amount: 30 μm
Number of revolutions of lower platen: 40 rpm
Number of revolutions of upper platen: 35 rpm
Number of revolutions of inner gear: 14 rpm
Number of revolutions of outer gear: 29 rpm After completing the first polishing process, the glass substrate was successively immersed and cleaned in cleaning tanks of neutral detergent, pure water, pure water, IPA (isopropyl alcohol), and IPA (steam drying).

(5) Second Polishing Process

Subsequently, the second polishing process was performed by using the polishing device used in the first polishing process and replacing the hard polisher with a soft polisher (Polylux manufactured by Speed Fam Co., Ltd.). The polishing conditions were the same as those in the first polishing process except that the load was 100 g/cm$^2$, the polishing time was five minutes and the removed amount was 5 μm.

After completing the second polishing process, the glass substrate was successively immersed and cleaned in cleaning tanks of neutral detergent, neutral detergent, pure water, pure water, IPA (isopropyl alcohol), and IPA (steam drying). Additionally, ultrasonic waves were applied to the cleaning tanks.

(6) Chemical Reinforcing Process

After completing the grinding and polishing processes as aforementioned, the glass substrate was subjected to chemical reinforcement.

The chemical reinforcement was performed by mixing potassium nitrate (60%) and sodium nitrate (40%) to prepare a chemical reinforcing solution, heating the chemical reinforcing solution to 400° C., and immersing the glass substrate cleaned and preheated to 300° C. in the chemical reinforcing solution for about three hours. In order to chemically reinforce the entire surface of the glass substrate, immersion was performed while a plurality of glass substrates were held at the end surfaces in a holder.

Through the immersion processing in the chemical reinforcing solution, lithium ions and sodium ions in a glass substrate surface layer were substituted for sodium ions and potassium ions in the chemical reinforcing solution, respectively, to reinforce the glass substrate.

The thickness of a compression stress layer formed on the surface layer of the glass substrate was about 100 to 200 μm.

After the chemical reinforcement was completed, the glass substrate was immersed in a water tank of 20° C., quenched and held for about ten minutes.

The quenched glass substrate was immersed and cleaned in concentrated sulfuric acid heated to about 40° C.

After completing the cleaning in the sulfuric acid, the glass substrate was successively immersed and cleaned in cleaning tanks of pure water, pure water, IPA (isopropyl alcohol), and IPA (steam drying). Additionally, ultrasonic waves were applied to the cleaning tanks.

Evaluation

The surface roughness Ra of the inner peripheral end surface of the glass substrate for the magnetic recording medium obtained through the above-mentioned processes was 0.028 μm on the chamfered portion 1b and 0.030 μm on the side-wall portion 1a shown in FIG. 2. The surface roughness Ra of the outer peripheral end surface was 0.04 μm on the chamfered portion, and 0.07 μm on the side-wall portion. Moreover, the surface roughness Ra of the main surface of the glass substrate was 0.3 to 0.7 nm (measured with the interatomic force microscope (AFM)). Observation of the end surface with an electronic microscope (4000 times) showed a mirror surface state.

Additionally, no foreign particles or cracks were found on the inner peripheral end surface of the glass substrate for the magnetic recording medium, and for the glass surface, no particles causing foreign particles or thermal asperity were found.

Furthermore, when the deflection strength was measured using a deflection strength tester (Shimazu Autograph DDS-2000) shown in FIG. 3, it was 12 to 20 kg. Additionally, when the deflection strength was measured in the same manner while changing a chemical reinforcing level, it was about 10 to 25 kg.

(7) Magnetic Disc Manufacture Process

A texture layer of sputtered Aluminum nitride (AlN), a Cr underlying (primary) layer, a CrMo underlying (primary) layer, a CoPtCrTa magnetic layer, and a Carbon protective layer were successively formed on each of opposite surfaces of the glass substrate for the magnetic disc obtained through the processes described above using an in-line type sputtering device (apparatus), to obtain an MR head magnetic disc.

For the resultant magnetic disc, it was confirmed that no defects on the magnetic layers or other films were generated by foreign particles. Additionally, a glide test showed neither hit (hit of the head on a magnetic disc surface) nor crush (crush of the head against protrusions on the magnetic disc surface). Furthermore, a regeneration test with the magnetic resisting head (the magnetro-resistive head) showed no regeneration error by the thermal asperity.

FIFTEENTH EXAMPLE

A glass substrate for a magnetic recording medium and the magnetic recording medium were obtained in the same manner as the fourteenth example, except that the inner and outer peripheral end surfaces were polished using the polishing pad instead of the rotary brush.

As a result, the surface roughness Ra of the outer peripheral end surface was 0.03 μm on the chamfered portion, and 0.01 μm on the side-wall portion, and the surface roughness Ra of the inner peripheral end surface was 0.03 μm on the chamfered portion, and 0.01 μm on the side-wall portion.

FIFTH COMPARATIVE EXAMPLE

A glass substrate for a magnetic recording medium and the magnetic recording medium were obtained in the same manner as the second example, except that a diamond wheel was used instead of the rotary brush to polish the inner peripheral end surface.

As a result, the surface roughness was in the same degree as the surface roughness of the inner and outer peripheral end surfaces immediately after the chamfering processing in the second example. Additionally, when the end surface was observed with the electronic microscope (4000 times), a coarse ground state was found and remarkably poor smoothness was provided.

SIXTH COMPARATIVE EXAMPLE

A glass substrate for a magnetic recording medium and the magnetic recording medium were obtained in the same manner as the second example, except that the etching processing of the inner and outer peripheral end surfaces were performed by chemical etching, instead of using the rotary brush.

As a result, the surface roughness was deteriorated by about 0.1 μm in Ra and about 0.7 μm in Rmax as compared with before the etching processing. Additionally, when the end surface was observed with the electronic microscope (4000 times), cracks were etched, enlarged and indented to easily catch particles. Poor smoothness and residual cracks were found.

SIXTEENTH TO NINETEENTH EXAMPLES, SEVENTH AND EIGHTH COMPARATIVE EXAMPLES

Subsequently, glass substrates were prepared in the same manner as the thirteenth example, except that the number of revolutions of the rotary brush 4 was appropriately adjusted, and the flow rate of the abrasive liquid was changed to 80 ml/min (seventh comparative example), 100 ml/min (sixteenth example), 250 ml/min (seventeenth example), 750 ml/min (eighteenth example), 1000 ml/min (nineteenth example), and 1200 ml/min (eighth comparative example). Results are shown in table 2. The number of measured substrates is 100, and for surface states, results of surface observation by the optical microscope are shown in circles when there are no scratches or damages and in crosses when there are scratches and damages.

TABLE 2

|  | FLOW RATE (ml/min) | SCRATCH |
| --- | --- | --- |
| SEVENTH COMPARATIVE EXAMPLE | 450 | x |
| SIXTEENTH EXAMPLE | 500 | ○ |
| SEVENTEENTH EXAMPLE | 750 | ○ |
| EIGHTEENTH EXAMPLE | 1000 | ○ |
| NINETEENTH EXAMPLE | 3000 | ○ |
| EIGHTH COMPARATIVE EXAMPLE | 3200 | ○ |

As shown in the table 2, when the flow rate of the abrasive liquid was 450 ml/min, it was confirmed that there was a scratch on the end surface. It is considered that when the flow rate of the abrasive liquid is less than 500 ml/min, the abrasive liquid insufficiently spreads over the polishing brush, the polishing brush directly contacts the end surface of the glass substrate, and the damage is generated. Moreover, when the flow rate of the abrasive liquid exceeds 3000 ml/min, no scratch is generated, but the polishing speed unfavorably fails to rise.

TWELFTH TO TWENTY-SECOND EXAMPLES, NINTH AND TENTH COMPARATIVE EXAMPLES

Subsequently, glass substrates were prepared in the same manner as the thirteenth example, except that the inclination angle of the bristle 43 helically planted on the rotary brush 4 was changed to 1° (ninth comparative example), 5° (twentieth example), 15° (twenty-first example), 30° (twenty-second example), and 35° (tenth comparative example). Results are shown in table 3. The number of measured substrates was 100, in the surface observation by the optical microscope, the substrate having scratches or damages was judged to be defective, and the defect ratio was calculated.

TABLE 3

|  | INCLINATION ANGLE (°) | DEFECT RATIO (%) |
| --- | --- | --- |
| NINTH COMPARATIVE EXAMPLE | 1° | 50 |
| TWENTIETH EXAMPLE | 5° | 0 |
| TWENTY-FIRST EXAMPLE | 15° | 0 |
| TWENTY-SECOND EXAMPLE | 30° | 0 |
| TENTH COMPARATIVE EXAMPLE | 35° | 0 |

As shown in the table 3, when the inclination angle of the bristle 43 was 1°, the scratch and polishing defect were generated on the end surface, and the defect ratio increased. It is considered that when the inclination angle of the bristle is less than 2°, the abrasive liquid insufficiently spreads over the polished surface, the polishing brush often directly contacts the end surface of the glass substrate, and the defect ratio increases. Moreover, when the inclination angle of the bristle exceeds 30°, the abrasive liquid easily penetrates along the bristles as compared with the small inclination angle, but the bristles are not constantly in contact with the glass substrate end surface, and the polishing speed is unfavorably retarded.

TWENTY-THIRD TO TWENTY-SIXTH EXAMPLES, ELEVENTH AND TWELFTH COMPARATIVE EXAMPLES

Subsequently, glass substrates were prepared in the same manner as the thirteenth example, except that types of the free abrasive grains or the like were appropriately selected, and the viscosity of the abrasive liquid containing the free abrasive grains for use during the end surface polishing process was changed to 1.3 cps (eleventh comparative example), 1.5 cps (twenty-third example), 5.0 cps (twenty-fourth example), 10.0 cps (twenty-fifth example), 25.0 cps (twenty-sixth example), and 27.0 cps (twelfth comparative example). Results are shown in table 4. For surface states, the results of surface observation by the optical microscope are shown in circles when there are no scratches or damages and in crosses when there are scratches and damages.

TABLE 4

|  | VISCOSITY | SCRATCH |
| --- | --- | --- |
| ELEVENTH COMPARATIVE EXAMPLE | 1.3 cps | x |
| TWENTY-THIRD EXAMPLE | 1.5 cps | ○ |
| TWENTY-FOURTH EXAMPLE | 5.0 cps | ○ |
| TWENTY-FIFTH EXAMPLE | 10.0 cps | ○ |
| TWENTY-SIXTH EXAMPLE | 25.0 cps | ○ |
| TWELFTH COMPARATIVE EXAMPLE | 27.0 cps | x |

As shown in the table 4, it was confirmed that there were scratches on the end surface of the substrate with the viscosity of the abrasive liquid of 1.3 cps, 27.0 cps. It is considered that when the viscosity is less than 1.5 cps, during polishing no abrasive grain is interposed between the brush and the glass substrate in some places, and the direct contact of the brush with the glass substrate makes the scratches. Moreover, when the viscosity exceeds 25.0 cps, because of the high viscosity, the load applied to the rotary drive unit for rotating the rotary brush increases, the abrasive liquid is easily agglomerated, and the agglomerated abrasive liquid interposed between the brush and glass substrate makes the scratches during polishing.

TWENTY-SEVENTH AND TWENTY-EIGHTH EXAMPLES

Glass substrates for magnetic discs and the magnetic discs were obtained in the same manner as the fourteenth example, except that soda-lime glass (twenty-seventh example) and soda aluminosilicate glass (twenty-eighth example) were used instead of aluminosilicate glass.

As a result, when the soda-lime glass was used, the outer and inner peripheral end surfaces of the glass substrate were slightly rougher than when aluminosilicate glass was used, which was not a practical problem.

TWENTY-NINTH EXAMPLE

An underlying layer formed of Al (thickness of 50 angstroms)/Cr (1000 angstroms)/CrMo (100 angstroms), a magnetic layer of CoPtCr (120 angstroms)/CrMo (50 angstroms)/CoPtCr (120 angstroms), and a Cr (50 angstroms) protective layer were formed on each of the opposite surfaces of the magnetic disc glass substrate obtained in the second example using the in-line type sputtering device.

The substrate was immersed in an organic silicon compound solution (mixed liquid of water, IPA and tetraethoxysilane) with fine silica particles (particle diameter of 100 angstroms) dispersed therein, and calcined to form the protective layer formed of $SiO_2$ having a texture function thereon. Furthermore, dipping treatment was applied onto the protective layer using the lubricant of perfluoropolyether to form a lubricant layer. The magnetic disc for MR head was thus obtained.

For the magnetic disc, the same as in the fourteenth example was confirmed.

THIRTIETH EXAMPLE

A magnetic disc for a thin-film head was obtained in the same manner as the twenty-ninth example, except that the underlying layer was Al/Cr/Cr, and the magnetic layer was CoNiCrTa.

For the magnetic disc, the same as in the fourteenth example was confirmed.

In the above-described embodiment, by combining the spraying of the abrasive liquid containing the free abrasive grains with the polishing brush for the inner and outer peripheral end surfaces of the glass substrate, the inner peripheral end surface of the glass substrate difficult to be polished with a high precision can be smoothed efficiently in simple method and at lower cost and high level.

Moreover, not only the chamfered portion but also the side-wall portion in the inner and outer peripheral end surfaces of the glass substrate can simultaneously be smoothed efficiently at low cost and high level.

Furthermore, according to the polishing device of the present invention, by the rotating movement of the glass substrate holding means, the rotating movement of the rotary brush, and the supply of the abrasive liquid, the inner and outer peripheral end surfaces of the glass substrate can efficiently be smoothed efficiently with the simple device at low cost and high level as compared with the other devices.

The preferred embodiments of the present invention have been described in the above, but the present invention is not necessarily limited to the embodiments.

For example, the types of the glass substrate and the magnetic layer are not limited to those in the embodiments.

Examples of the material of the glass substrate include an aluminosilicate glass, a soda-lime glass, a soda aluminosilicate glass, an aluminoborosilicate glass, a borosilicate glass, a quartz glass, a chain silicate glass, a glass ceramic such as a crystallized glass, and the like.

Examples of the aluminosilicate glass include a chemical reinforcing glass which mainly contains 62 to 75 wt % of $SiO_2$, 5 to 15 wt % of $Al_2O_3$, 4 to 10 wt % of $Li_2O$, 4 to 12 wt % of $Na_2O$, and 5.5 to 15 wt % of $ZrO_2$ and which has an $Na_2O/ZrO_2$ weight ratio of 0.5 to 2.0 and an $Al_2O_3/ZrO_2$ weight ratio of 0.4 to 2.5.

Moreover, in order to eliminate protrusions on the glass substrate surface caused by insoluble substances of $ZrO_2$, for example, a chemical reinforcing glass is preferably used which contains, in terms of mol %, 57 to 74% of $SiO_2$, 0 to 2.8% of $ZrO_2$, 3 to 15% of $Al_2O_3$, 7 to 18% of $LiO_2$, and 4 to 14% of $Na_2O$.

By chemically reinforcing the aluminosilicate glass or the like having the composition described above, the deflection strength is increased, the compression stress layer is deepened, and a superior Knoop hardness is provided.

Examples of the magnetic layer include magnetic thin films mainly composed of Co such as CoPt, CoCr, CoNi, CoNiCr, CoCrTa, CoPtCr, CoNiPt, CoNiCrPt, CoNiCrTa, CoCrTaPt, CoCrPtSiO, and the like. The magnetic layer may have a multilayered structure (e.g., CoPtCr/CrMo/CoPtCr, CoCrTaPt/CrMo/CoCrTaPt, and the like) which is obtained by dividing the magnetic film with a non-magnetic film (e.g., Cr, CrMo, CrV, and the like) to reduce noises.

Examples of the magnetic layer for the magnetic resisting head (the magnetro-resistive head (MR head)) or the giant magnetic resisting head (the giant magnetro-resistive head) (GMR head) include a magnetic layer of a Co alloy which contains an impurity element selected from a group consisting of Y, Si, rare earth element, Hf, Ge, Sn, and Zn, or an oxide of the impurity element.

Moreover, as the magnetic layer, a granular structure may be used in which magnetic particles of Fe, Co, FeCo, CoNiPt, or the like are dispersed in a non-magnetic film composed of ferrite, iron-rare earth element, $SiO_2$, BN, and the like. Additionally, the magnetic layer may have a recording format of either an inner-face longitudinal type or a vertical (perpendicular) type.

The glass substrate for the magnetic recording medium of the present invention may be used as a glass substrate for an optical magnetic disc which rejects microfine particles generated from the glass substrate end surfaces, or a glass substrate for an electron optical disc like an optical disc.

Moreover, the polishing method and device of the present invention can be used as polishing method and device of a glass carbon, a crystal material (including a single crystal material), a brittle material like a ceramic material, a metal material, and the like.

As aforementioned, according to the polishing method and device of the present invention, the inner peripheral end surface and/or the outer peripheral end surface of the glass substrate or the like can efficiently be smoothed at low cost and high level. Therefore, the high-level cleaning of the substrate surface can be realized, while the deflection strength can be enhanced.

THIRTY-FIRST AND THIRTY-SECOND EXAMPLES

A glass substrate for a magnetic disk and the magnetic disk were obtained in the same manner as in Example 2, except that instead of aluminosilicate glass, crystallized glass was used, the polishing devices of FIG. 1 (Example 31), FIG. 6 (Example 32) were used, respectively, no chemically reinforcing process was performed, and a heating process for crystallizing glass was performed.

Evaluation

The surface roughness Ra of the inner peripheral end surface of the glass substrate for the magnetic recording medium obtained in the method described above was 0.3 μm in the chamfered portion 1b shown in FIG. 2, and 0.05 μm in the side-wall portion 1a, the surface roughness Ra of the outer peripheral end surface was 0.2 μm in the chamfered portion, and 0.1 μm in the side-wall portion, slightly rough surfaces were obtained as compared with aluminosilicate glass, but there was neither hit nor crash in the glide test, there was no regeneration malfunction by thermal asperity, and there was no practical problem.

What is claimed is:

1. A method of manufacturing a glass substrate for a magnetic recording medium comprising steps of: supplying an abrasive liquid containing free abrasive grains to an outer peripheral end surface of a glass substrate in the form of a circular disc having a circular hole in a center portion; and rotating a polishing brush in contact with the outer peripheral end surface of said glass substrate to perform polishing in a range between 0.001 μm to 0.04 μm in surface roughness Ra, wherein the bristles of said polishing brush are inclined and disposed with respect to a plane vertical to a rotation shaft at the angle of between 2° and 30°.

2. The method according to claim 1 further comprising a step of stacking and polishing a plurality of glass substrates so that the outer peripheral end surfaces of the plurality of glass substrates are simultaneously polished.

3. The method according to claim 1 or 2 wherein the viscosity of the abrasive liquid containing said free abrasive grains is in a range of 1.5 to 25 cps.

4. A method of manufacturing a magnetic recording medium, comprising a step of forming at least a magnetic layer on the magnetic recording medium glass substrate according to claim 1.

5. A method of manufacturing a glass substrate for a magnetic recording medium, the glass substrate being in the form of a circular disc having a circular hole in a center portion of the disc, wherein an outer peripheral end surface of the glass substrate is polished by following steps:

supplying an abrasive liquid containing free abrasive grains on the outer peripheral end surface of the glass; and rotating a polishing brush in contact with the outer peripheral end surface of said glass substrate to perform polishing, wherein a plurality of glass substrates are stacked and polished so that the outer peripheral end surfaces of the plurality of glass substrates are simultaneously polished, outer and inner peripheral end surfaces are subject to a predetermined chamfer processing and polished so as to provide the outer peripheral end surface and a chamfered portion of the outer peripheral end surface with a surface roughness Ra in a range between 0.001 μm to 0.5 μm and a maximum surface roughness Rmax in a range between 0.01 μm to 4 μm in order to prevent thermal asperity, wherein bristles of said polishing brush are inclined and disposed with respect to a plane vertical to a rotation shaft at the angle of between 2° and 30°.

6. A method of manufacturing a glass substrate for a magnetic recording medium comprising steps of:

supplying an abrasive liquid containing free abrasive grains to an outer peripheral end surface of a glass substrate in the form of a circular disc having a circular hole in a center portion; and rotating a polishing brush in contact with the outer peripheral end surface of said glass substrate to perform polishing, wherein bristles of said polishing brush are helically planted on the surface of a rotation shaft of said polishing brush and are inclined and disposed with respect to a plane vertical to a rotation shaft at the angle of between 2° and 30°.

* * * * *